United States Patent [19]

Thrasher, Jr.

[11] 4,094,383
[45] June 13, 1978

[54] AIR LINE LUBRICATOR

[75] Inventor: George E. Thrasher, Jr., Sterling Heights, Mich.

[73] Assignee: Master Pneumatic-Detroit, Inc., Sterling Heights, Mich.

[21] Appl. No.: 730,142

[22] Filed: Oct. 6, 1976

[51] Int. Cl.² ............................................. F16N 7/32
[52] U.S. Cl. ............................ 184/55 A; 137/205.5; 251/8
[58] Field of Search ............... 184/55 A, 56 R, 56 A, 184/58, 50, 6.26; 251/8; 137/205.5; 239/311

[56] References Cited

U.S. PATENT DOCUMENTS

| 2,229,176 | 1/1941 | Kehle | 184/55 A |
|---|---|---|---|
| 2,935,088 | 5/1960 | Thompson et al. | 251/8 X |
| 3,085,654 | 4/1963 | Friedell et al. | 174/55 A |
| 3,214,054 | 10/1965 | Poethig et al. | 184/55 A X |
| 3,512,748 | 5/1970 | Wilson | 251/8 |
| 3,696,889 | 10/1972 | Brake | 184/55 A |
| 3,703,940 | 11/1972 | Morita | 184/55 A |
| 3,982,609 | 9/1976 | Bouplon | 184/56 A |

Primary Examiner—David H. Brown
Attorney, Agent, or Firm—Barnes, Kisselle, Raisch & Choate

[57] ABSTRACT

In a lubricator which introduces lubricant from a reservoir into an air line through a metering orifice under pressure differential induced by a flow of air through the lubricator, the orifice is replaced by a resiliently flexible tube whose walls are adjustably squeezed together along a substantial length by a pair of threaded clamp elements to provide a metering restriction which is relatively long and therefore permissibly having a relatively large sectional area which is more accurately adjustable and clog free than the conventional orifice.

32 Claims, 10 Drawing Figures

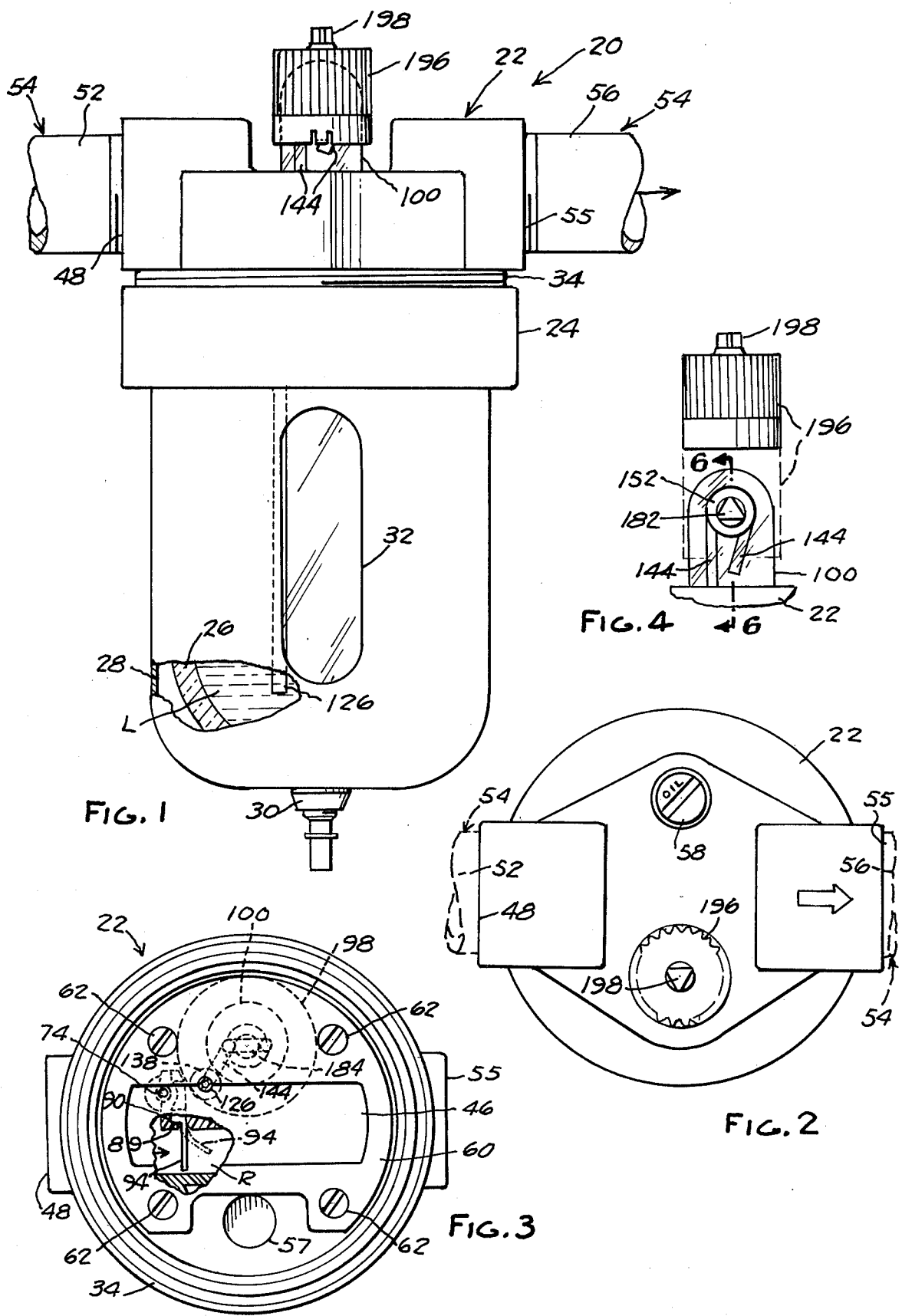

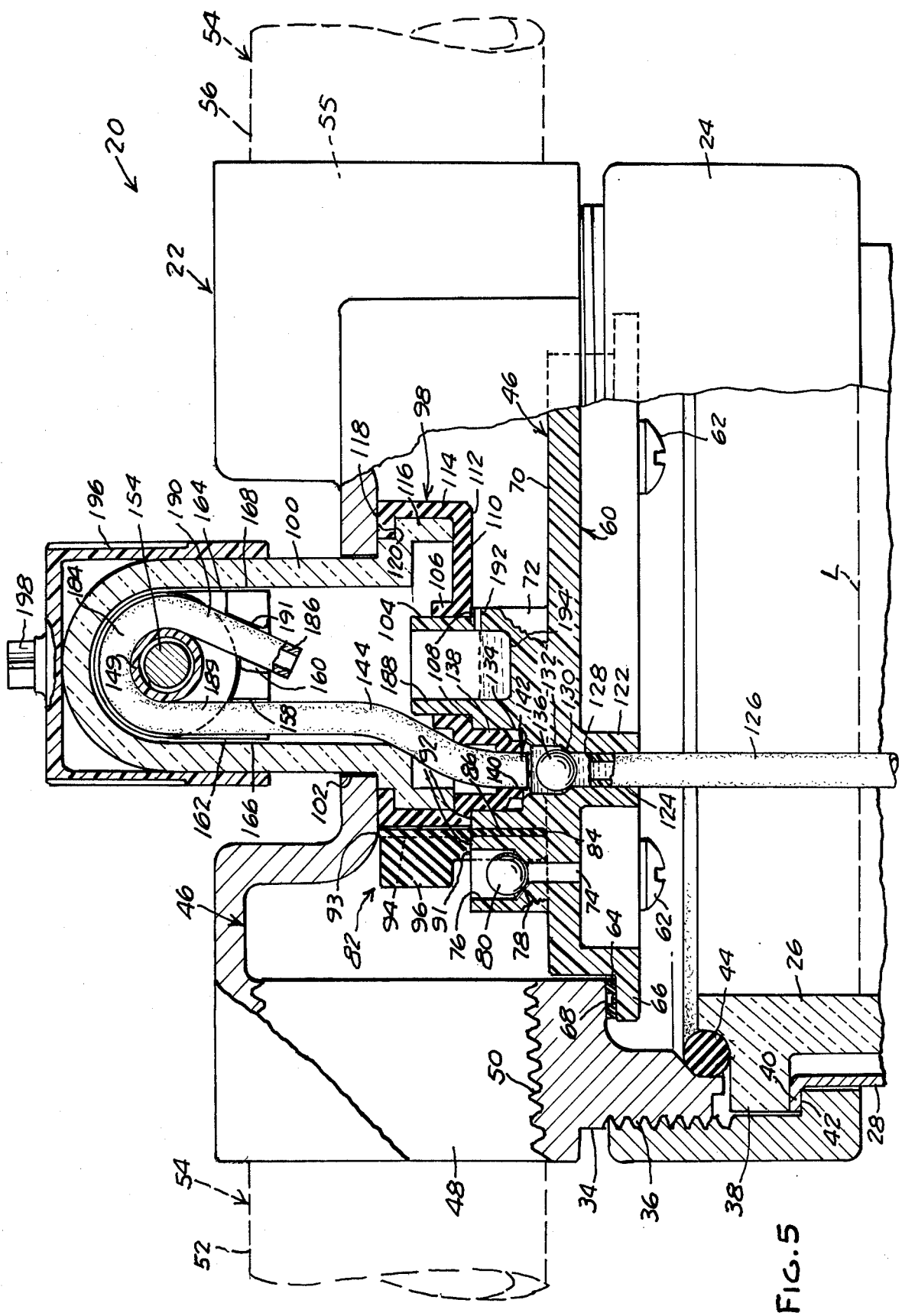

AIR LINE LUBRICATOR

This invention relates generally to a lubricator of the type which is mounted in a pneumatic line through which air under pressure flows for driving a pneumatic motor. The lubricator introduces lubricant into the pneumatic line and the lubricant is propelled by the air to the motor for lubricating purposes. More particularly, the invention relates to a lubricator of this type which employs pressure differential induced by the air flow therein to force lubricant from a reservoir into the pneumatic line through a metering orifice.

To function satisfactorily, a lubricator of this type must be able to deliver lubricant both in very small quantities and at uniform though adjustable rates. Typically, a lubricator may be required to deliver lubricant at rates ranging from about 1 drop to about 10 drops per 20 standard cubic feet per minute air flow (scfm), a drop being defined as 1/30 cc. In a typical conventional lubricator, the delivery rate is controlled by a needle valve projecting adjustably into a metering orifice. This arrangement gives rise to difficulties and deficiencies in operation for the following reasons. The resistance to flow of the lubricant through a metering restriction is a function of the length of the restriction and of the effective open area of the restriction. In the conventional lubricator the metering orifice is very short and the effective area of the metering opening must therefore be kept very small. Consequently, it is difficult to attain the fine degree of adjustment of the needle valve necessary to dimension the metering orifice properly for delivering lubricant at an accurately controlled rate. Moreover, the effective open area of the orifice is so small that it tends to trap small particles of dirt or other particulate matter and such trapped particles significantly alter the size of the metering orifice, necessitating frequent adjustments of the needle valve.

When the flow of air through a lubricator of the type under consideration is discontinued for a period of time, it loses its prime. When the air flow through the lubricator is resumed, the lubricating system therein must be primed before delivery of lubricant to the pneumatic line is resumed, and the motor or equipment served by the line is thus without lubricant for a period of time. This period of time is objectionably long for numerous conventional lubricators because the metering orifice is relatively distant from the lubricant delivery point and the priming of the system downstream of the orifice occurs at a rate governed by the slow rate of flow of the lubricant through the orifice.

The object of the present invention is to provide a relatively simple, inexpensive pressure differential operated air line lubricator which is improved to provide a relatively long metering restriction of relatively large effective open area which can be quickly and conveniently adjusted to control accurately the metered flow of lubricant and which is relatively clog-free, and improved to recover its prime quickly after long periods of inactivation to insure relatively prompt resumption of lubricant delivery to the equipment with which it is used.

One form of the invention is shown in the accompanying drawings wherein:

FIG. 1 is a side elevational view of a lubricator according to the present invention, a portion being broken away and shown in section to illustrate structural detail.

FIG. 2 is a top plan view of the lubricator.

FIG. 3 is a bottom plan view of the head of the lubricator taken separately.

FIG. 4 is a fragmentary end elevational view of upper end portions of the lubricator.

FIG. 5 is an enlarged scale generally vertical sectional view of the head of the lubricator.

Figure 6:
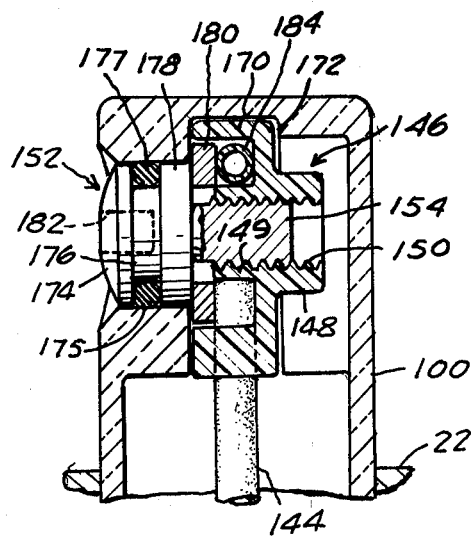
FIG. 6 is an enlarged scale sectional view on line 6—6 of FIG. 4.

Shown in the drawings is a lubricator 20 having a head 22 which through a coupling ring 24 supports a cup shaped transparent lubricant reservoir 26 of plastic or the like surrounded by a protective metal shield 28. Reservoir 26 has a drain cock 30, and shield 28 has one or more sight openings 32 for observing the level of lubricant L in the reservoir. Head 22 has a depending annulus 34 (FIG. 5) to which ring 24 is coupled through threading 36. Reservoir 26 and shield 28 respectively have outward superposed flanges 38 and 40 adjacent their upper ends which are clamped upwardly relative to annulus 34 by an inward flange 42 adjacent the bottom of ring 24, and an O-ring seal 44 is interposed between cup flange 38 and annulus 34.

Head 22 has a hollow interior which in part defines an air flow passageway 46 having an upstream end 48 threaded at 50 for connection with an upstream portion 52 of an air line 54. Similarly, passageway 46 has a downstream end 55 threaded for connection with a downstream portion 56 of air line 54. Head 22 has a fill opening 57 (FIG. 3) above and displaced laterally from passageway 46, this opening being normally closed by a removable plug 58 (FIG. 2) during operation of the lubricator.

A cartridge 60 of relatively inexpensive material such as injection molded plastic is secured within annulus 34 by screws 62 threaded into head 22 and a gasket 64 is provided between an outward flange 66 on cartridge 60 and a shoulder 68 on head 22. Cartridge 60 and gasket 64 thereby provide a hermetic closure for a bottom of passageway 46. Cartridge 60 includes a floor 70 having an upward integral boss 72. An opening 74 extends through floor 70 and upwardly through a portion of boss 72. Opening 74 continues upwardly in an enlarged hollow portion 76 of boss 72 which opens into passageway 46. One or more grooves 78 extend between opening 74 and enlarged portion 76. A ball 80 of plastic such as nylon seats upon and closes the bottom of enlargement 76 except for grooved portion or portions 78 for a purpose to be described. Opening 74, enlargement 76 and groove or grooves 78 cooperate to form an air duct through which the pressure of air at inlet end 48 of passageway 46 is introduced into lubricant cup 26 for acting on the exposed upper surface of lubricant L in the cup.

Figure 10:
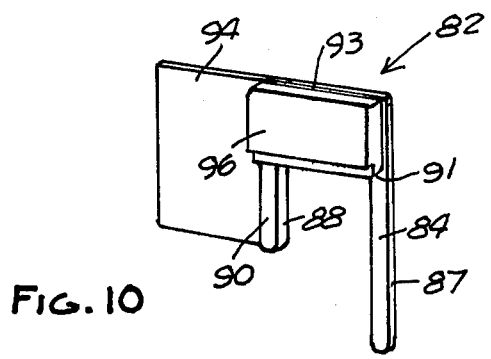
FIG. 10 is a perspective view on approximately the scale of FIG. 5 showing a flow restrictor and seal unit.

A flow restrictor 82 (FIGS. 5 and 10) is mounted on boss 72 generally adjacent pressure duct 74–78. The flow restrictor has a leg 84 which fits in a groove 86 in the boss and has an exposed edge surface 87, another leg 88 which fits in another groove 89 (FIG. 3) in the boss and which has a side surface 90, a shoulder 91 which engages a top portion 92 of the boss, and a ridged top surface 93. Surfaces 87 and 93 engage against portions of head 22 defining passageway 46, and surface 90 engages a portion of groove 89. Flow restrictor 82 is made of an elastomer material such as a synthetic rubber so that surfaces 87, 90, 91 and 93 form seals with the surfaces against which they are engaged to contain the flow of air through passageway 46. The flow restrictor also has a relatively thin flexible vane 94 which projects into the path of air flow through passageway 46 to form a Venturi restriction therein. Flow restrictor 82 has a horizontal enlargement 96 which projects over the top of passageway enlargement 76 for a purpose to be described.

Boss 72 through a sealing boot 98 supports a transparent sight dome 100 of plastic or the like which projects upwardly from within passageway 46 through an opening 102 in head 22 to a location exposed above the head. Boss 72 has a hollow vertical projection 104 generally centrally aligned with sight dome 100 around which a central hub portion 106 of boot 98 is engaged. Hub 106 seats vertically on a shoulder 108 on boss 72 extending radially outwardly of projection 104. The boot has a bottom wall 110 extending radially outwardly from hub 106 and having a bottom surface 112, a portion of which engages against top surface 92 of boss 72 generally adjacent passageway enlargement 76. Bottom wall 112 terminates radially outwardly in a U-shaped rim 114 which opens radially inwardly and contains on three sides an enlarged annular base 116 of sight dome 100 having rectangular cross sectional shape as shown in FIG. 5. Rim 114 of the boot has a top surface 118 engaged against the top of the interior surface 120 of hollow head 22 around opening 102. Boot 98 is made of an elastomeric material such as synthetic rubber so that the various surfaces thereof which are engaged with surface portions of boss 72 and the interior of head 22 form hermetic seals to prevent the escape of air flowing through passageway 46.

Depending from cartridge floor 70 is a boss 122 providing with an opening 124 into which a lubricant supply tube 126 is secured as by press fitting. Tube 126 extends downwardly into cup 26 to a location adjacent the bottom of the cup as shown in FIG. 1. Opening 124 extends above the top end 128 of tube 126 and continues in a portion 130 which tapers outwardly to an enlargement 132 which in turn continues to a further enlargement 134. A ball check 136 is contained in enlarged portion 132 and rests on the seat defined by tapered portion 130. Ball 136 is made of a corrosion resistant material such as stainless steel. Sealing boot 98 has a nipple 138 which depends from bottom wall 110 and fits snugly within enlargement 134 to provide a hermetic seal. Nipple 138 has an opening 140 into which the lower end 142 of lubricant supply tube 144 is snuggly fitted also to provide a hermetic seal. As will become apparent, tubes 126, 144 may be regarded as a single tube having a discontinuity at 130, 132 which contains ball 136.

A clamp 146 (FIGS. 6 and 7) is disposed within an upper portion of sight dome 100. The clamp includes a cup shaped element 148 having a generally central boss 149 with a threaded opening 150 and an adjustment screw 152 having a threaded shank 154 engaged within opening 150. Cup 148 has two spaced apart downwardly disposed openings 158, 160 (FIG. 5). The cup has a pair of oppositely facing side surfaces 162, 164 disposed generally adjacent internal surface portions 166, 168 of sight dome 100 and has a top rim portion 170 positioned in a recess 172 in the top of the sight dome.

Figure 7:
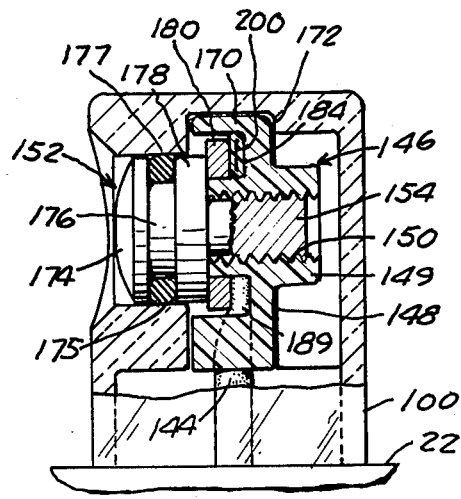
FIG. 7 is a view similar to FIG. 6 but showing the parts in a different relation.
Figure 8:
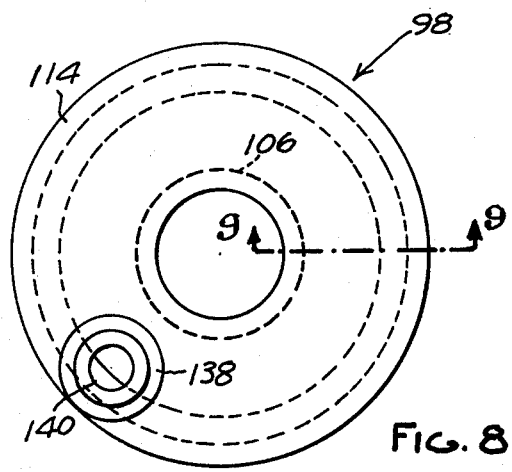
FIG. 8 is a bottom plan view of a sealing boot on approximately the scale of FIG. 5.
Figure 9:
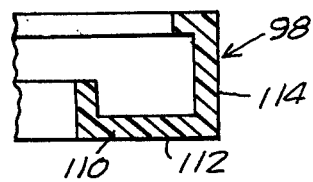
FIG. 9 is a sectional view on line 9—9 of FIG. 8.

Screw 152 has a head 174 disposed within an opening 175 in sight dome 100, this opening extending from the interior to the exterior of the sight dome as shown in FIGS. 6 and 7. Head 174 is grooved at 176 to receive an O-ring 177, the groove also setting off an axially inner portion of the head as a flange like configuration 178. A washer 180 encircles screw shank 154 and has an internal diameter adequate to pass around boss 149. Screw 152 has a non-circular recess 182 extending axially inwardly from the exposed outer surface of head 174 for a purpose to be described.

For convenience and economy of manufacture, cup 148 comprises an injection molding of a plastic such as polyester while screw 152 and washer 180 are formed of corrosion resistant metal such as brass. During assembly of clamp 146 in the sight dome, rim 170 of cup 148 and recess 172 cooperate to locate the cup so that opening 150 therein is positioned for receiving screw shank 154 when the latter is inserted through opening 175 in the sight dome. In assembled relation, clamp is supported in the sight dome by engagement within opening 175 of screw head 174, including flange 178 and O-ring 177.

Lower end 142 of tube 144 is disposed slightly above ball check 136. From there, the tube extends upwardly into sight dome 100 through opening 158 in cup 148, is entrained in a loop 184 around boss 149, extends downwardly through opening 160 in cup 148 and terminates at a delivery end 186 above a cup 188 formed by the hollow interior of vertical projection 104 on boss 72. Loop 184 extends through an arc of somewhat more than 180° and is adjoined by leg portions 189 and 190 (FIG. 5) of tube 144. Loop 184 and legs 189, 190 are disposed axially between washer 180 and the bottom of cup 148. The combined length of loop 184 and legs 189, 190 is preferably in the range of about three to twenty times the internal diameter of tube 144 in its unsqueezed condition. Washer 180 has a radial thickness at least about as great as the outside diameter of the tube portion forming loop 184 in unsqueezed condition (FIG. 6). Opening 160 is configured at 191 to direct end 186 of the tube toward a location generally above the center of cup 188 as shown in FIG. 5. Cup 188 has a delivery port 192 which is disposed above the bottom 194 of the cup and which opens into passageway 146 downstream of flow restrictor vane 94.

A cap 196 of injection molded plastic or similar inexpensive material is frictionally fitted around the upper portions of sight dome 100 containing clamp 146 and loop 184. Projecting from the top of cap 196 is a lug 198 whose shape is complemental to that of recess 182 in adjustment screw head 174.

In use, it will be assumed that upstream and downstream portions 52, 56 of air line 54 are connected respectively into inlet end 48 and outlet end 55 of passageway 46 in the manner described and that cup 25 contains a supply of lubricant. When air flows through passageway 46 en route to a pneumatic motor, the relatively high pressure of the air at inlet 48 is transmitted into reservoir 26 through duct 74–78 where it acts upon the top surface of lubricant L in the reservoir. The flow of air through passageway 46 diverts vane 94 from the solid line position of FIG. 3 to the dotted line position thereof forming a Venturi restriction R which reduces the pressure of the air in passageway 46 downstream of the restriction typically by about 2 psi. This reduced pressure is transmitted to the ball check 136 through port 192, cup 188, tube 144, and upper portion 132 of opening 124 in cartridge 60. The greater pressure of the air acting on the upper surface of lubricant L forces the lubricant upwardly through tube 126 which unseats ball 136 from tapered portion 130 of opening 124. Lubricant is forced upwardly into tube 144 through lower end 142, around loop 184, and downwardly to the end 186 of the tube from which it drips into cup 188. O-ring 177 prevents escape of air from dome 100 through opening 175 during operation of the lubricator.

When cup 188 fills to the level of delivery port 192, lubricant is delivered through this port into the flow of air in passageway 146. The lubricant thus delivered is carried by the air stream to the motor or other equipment being driven by the air. The function of cup 188 and delivery port 192 is to prevent turbulence in the air stream from forcing the lubricant back up into sight dome 100 or elsewhere where delivery would be impaired.

In numerous applications, pneumatic motors are operated intermittently for only short periods of time resulting in intermittent, brief period flows of air through passageway 46. Ball check 136 unseats and reseats upon tapered portion 130 of passageway 124 upon each starting and stopping of the air flow in passageway 46. When seated, the ball prevents retrograde movement of the lubricant in tube 126, 144. This causes the lubricant to be pumped incrementally through the system for delivery through port 192 upon intermittent short duration flows of air through passageway 46, rather than permitting the lubricant to merely oscillate up and down in tube 126.

It is advantageous to be able to refill cup 26 with lubricant without turning off the air supply to air line 54. Ball 80 in cooperation with groove or grooves 78 in pressure duct 74–78 enable this to be done. Cup 26 may be filled either by removing it from head 22 by unscrewing ring 24 from annulus 34 or simply by removing plug 58 from fill opening 57. In either event, a certain amount of the air under pressure at inlet 48 will escape through groove or grooves 78 but the effective area thereof is so small as to limit the amount of escaping air to an insignificant volume. Once cup 26 has been refilled, it or plug 58 is replaced and normal operation is resumed.

Enlargement 96 on flow restrictor 82 prevents ball 80 from being dislodged from pressure duct enlargement 76 during the course of handling of lubricator 20 prior of installation and also under the impetus of any extraordinary retrograde surges of air pressure in the lubricator during the course of operation.

The rate at which lubricant is delivered into passageway 46 through port 192 is regulated by squeezing loop 184 and adjacent leg portions 189, 190 of tube 144 to form a metering restriction therein. This is accomplished by turning head 174 of adjustment screw 152 to advance flange 178 and washer 180 into cup 148 from the position of FIG. 6 to a position as represented by FIG. 7 wherein loop 184 and adjoining legs 189, 190 are squeezed to more or less flattened condition. In this condition, the internal opening in tube portions 184, 189, 190 assume generally the shape of a thin ribbon as represented at 200 in FIG. 7 which provides the metering restriction for controlling the flow of lubricant to and through orifice 192. The dimension of this restriction axially of cup 148 is adjustably increased or decreased by turning screw 152 in one direction or the other to increase or decrease the distance between washer 180 and the bottom of cup 148. Cup 148 is restrained against turning with screw 152 to any significant extent by engagement of side surfaces 162 or 164 of the cup with respectively opposed interior surfaces 166, 168 of sight dome 100.

In a typical lubricator according to the invention, tube 126 and tube 144 each has an interior diameter of 1/16 inch and the length of the metering restriction in tube 144 i.e., the length of squeezed loop 184 and adjoining legs 189, 190 is about 1 inch. With a metering restriction of this relatively great length, the dimension of the metering restriction in a direction axial of cup 148 can be relatively great. While it is difficult to obtain actual measurements of this dimension during operation of a lubricator 20, it is believed that this dimension in a typical lubricator 20 ranges from about 0.020 inches for delivering lubricant at a minimum rate of about 1 drop per scfm to about 0.025 inches for delivering lubricant at a maximum rate of about 10 drops per scfm. A typical lubricator 20 utilizes an adjustment screw 152 having a 40 pitch thread and washer 180 is moved through the approximate 0.005 inch travel between maximum and minimum adjustments by turning screw 152 through about 72°. In contrast, the needle valve of a conventional lubricator is turned through only about 10° between minimum and maximum lubricant flow adjustments.

In the typical lubricator 20 under consideration, metering restriction 200 has a height radial of cup 148 just slightly less than one half the circumference of the internal diameter of tube 144 ($\pi/32$ inch) i.e., about 0.093 inch. This dimension taken with the 0.020 to 0.025 inch dimension axially of cup 148 provides an effective open area within restriction 200 which is so large that it is virtually immune from clogging with trapped particulate matter and is only minimally, if at all, susceptible to significant changes in effective open area because of particulate matter trapped therein.

During the course of operation, cap 196 covers head 174 of adjustment screw 152 and thus protects the screw against accidental or unintentional turning which would change the adjustment of metering restriction 200. To effect an adjustment of screw 152, cap 196 is lifted manually off of sight dome 100 (solid lines, FIG. 4) and lug 198 on the cap is inserted into recess 182 in the screw. Cap 196 and lug 198 serve as a wrench to facilitate turning screw 152. After the adjustment has been effected, cap 196 is again manually slipped downwardly over sight dome 100. Should the danger of unauthorized tampering with the adjustment of screw 152 exceed the danger of accidental changing of the adjustment, cap 196 can simply be removed entirely. The odd shape of recess 182, for example, triangular, increases the difficulty of unauthorized tampering with the adjustment of screw 152, in the absence of cap 196.

When a pressure differential lubricator is inactive continually for a period of time, it loses its prime. When it is again activated, the lubricant system must be primed before delivery of lubricant into the air stream is resumed. In lubricator 20, metering restriction 200 is located immediately adjacent the delivery end of tube 144 i.e., that portion of the tube downstream of leg 190, which portion does not need to be primed. When lubricator 20 is activated after having lost its prime, tube 126, passageway portions 130, 132, and tube 144 immediately fill with lubricant up to leg 189 forming the entrance to restriction 200. The only remaining part of the system which needs to be re-primed is restriction 200 itself. Restriction 200 has a volume which approximates that of 1 drop of lubricant. Accordingly, depending on the setting of adjustment screw 152, the restriction will fill with lubricant and the entire system will be primed in about 6 seconds to about 1 minute cumulative operating time of the lubricator after priming of the system up to leg 189.

It will be observed that the lubricant dispensing system and components of lubricator 20 require no precision made parts. The cost of manufacture of a typical lubricator 20 is no greater than that of a conventional pressure differential lubricator.

I claim:

1. In a lubricator which introduces lubricant from a reservoir into an air line at a metered rate under pressure differential induced by air flowing through a passageway in the lubricator connected into the air line, improved structure which comprises,
   tubing which has an upstream end positioned to receive lubricant from said reservoir under said pressure differential,
   said tubing having a downstream end through which lubricant is delivered,
   said tubing having wall portions between said ends which can be squeezed inwardly to reduce the effective area of the tubing interior,
   and means operable to squeeze said wall portions sufficiently so that the reduced effective area thereof forms a restriction limiting to said metered rate the flow of lubricant through said tubing.

2. The structure defined in claim 1 wherein said restriction has a length at least three times the cross dimension of said tubing interior in unsqueezed condition.

3. The structure defined in claim 1 wherein said restriction has a length in the range from at least about three times to about 20 times the cross dimension of said tubing interior in unsqueezed condition.

4. In a lubricator as defined in claim 1 and which incorporates a member having a flexible vane which forms a Venturi restriction in said passageway, the lubricator also incorporating a receptacle apertured to pass air line pressure into said reservoir from upstream of said restriction and a ball in said receptacle which restricts air flow through the aperture, further improved structure wherein said member has an enlargement which overlies said receptacle and forms an obstruction to egress of said ball from said receptacle.

5. The structure defined in claim 1 wherein said upstream end is disposed in said reservoir,
   said tubing extending upwardly from said upstream end to said wall portions and downwardly from said wall portions to said downstream end,
   and check valve means effective to check downward movement of lubricant in said tubing from said wall portions toward said reservoir.

6. The structure defined in claim 5 wherein said tubing has a discontinuity above said reservoir, said check valve means comprising a ball check at said discontinuity.

7. The structure defined in claim 1 wherein said upstream end is located above said reservoir, said tubing extending upwardly from said upstream end to said wall portions, and means operable responsive to said pressure differential to deliver lubricant from said reservoir to said upstream end.

8. The structure defined in claim 7 wherein said wall portions are curved through an arc of about 180°, said tubing extending downwardly from said wall portions to said downstream end.

9. The structure defined in claim 1 wherein said wall portions lie on a curve.

10. The structure defined in claim 9 wherein said curve extends through about 180°.

11. The structure defined in claim 9 wherein said wall portions are resiliently flexibly squeezable, said means comprising two threadedly relatively movable elements engaged against opposite sides of said wall portions and being operable responsive to relative turning thereof to exert variable squeezing force on said wall portions for adjusting the size of said restriction.

12. The structure defined in claim 1 wherein said wall portions are resiliently flexibly squeezable and said means is operable to exert variable squeezing force thereon for adjusting the size of said restriction.

13. The structure defined in claim 12 wherein said means comprises two relatively movable elements, one having the form of a cup,
   said wall portions being disposed in said cup and including a loop extending through an arc of about 180° and leg portions extending upstream and downstream away from said loop,
   said cup having a bottom engaged against said loop and leg portions,
   the other of said elements being engaged against an opposite side of said loop and leg portions from that engaged by said bottom,
   said other element being advanceable and retractable in said cup for exerting said variable squeezing force on said loop and leg portions.

14. The structure defined in claim 13 wherein said cup and said other element are annular.

15. The structure defined in claim 14 wherein said cup has a side wall with spaced apart openings, said leg portions having respectively upstream and downstream extensions which project through said openings toward said upstream end and said downstream end of said tubing.

16. The structure defined in claim 15 wherein said cup has a central boss around which said loop is entrained.

17. The structure defined in claim 16 wherein said boss has a hollow threaded interior, said other element having a central shank which is threaded into said interior to facilitate said relative movement responsive to relative turning of said elements.

18. The structure defined in claim 1 wherein said wall portions are resiliently flexibly squeezable, said means comprising two threadedly relatively movable elements engaged against opposite sides of said wall portions and being operable responsive to relative turning thereof to exert variable squeezing force on said wall portions for adjusting the size of said restriction.

19. The structure defined in claim 18 wherein said lubricator has a body which supports said elements, said body having a portion which is open to the lubricator exterior through which one of said elements is accessible for turning.

20. The structure defined in claim 18 wherein said elements are threadedly interengaged, said lubricator having a hollow body portion within which said wall portions and interengaged portions of said elements are supported, said hollow portion having a portion which is open to the lubricator exterior through which one of said elements is accessible for turning.

21. The structure defined in claim 20 wherein said hollow portion and the other of said elements have surface portions which interengage to constrain said other element from turning movement with said one element.

22. The structure defined in claim 21 wherein the assembly of said elements is supported on said hollow portion by engagement of said one element within said open portion.

23. The structure defined in claim 20 and including in addition a cap which fits removably over the exterior of said hollow portion, said cap and said one element having complementally shaped means interengageable within said open portion to facilitate rotation of said one element by said cap.

24. The structure defined in claim 23 wherein said complementally shaped means comprises a projection on said cap and a recess in said one element.

25. The structure defined in claim 24 wherein said complementally shaped means have triangular configuration.

26. The structure defined in claim 18 wherein said elements ae threadedly interengaged, said lubricator having a hollow body portion within which said wall portions and interengaged portions of said elements are supported, said wall portions, progressing in the direction from said upstream end toward said downstream end, being curved through an arc of about 180°, one of said elements having a cup shaped region within which said arcuate wall portions are contained, the other of said elements having a portion which moves axially within said region responsive to relative turning of said elements for so adjusting the size of said restriction.

27. The structure defined in claim 26 wherein said other element has a shank threaded into said one element radially inwardly of said cup shaped region, said other element having a head which projects radially outwardly of said shank to provide said portion which moves axially within said cup.

28. The structure defined in claim 27 wherein said cup and the arc of said wall portions have a diameter greater than that of said head, and a ring interposed axially between said head and said arcuate wall portions, said ring having a radius which exceeds that of said head and is about equal to the radius of the arc of said wall portions in unsqueezed condition, said ring being effective to exert said variable squeezing force responsive to relative turning of said elements.

29. The structure defined in claim 28 wherein said hollow body portion has an opening to the exterior thereof through which said other element is accessible for turning.

30. The structure defined in claim 29 wherein said assembly of said elements is supported in said hollow portion by engagement of said head of said other element within said opening.

31. The structure defined in claim 30 wherein said hollow portion and said one element have surface portions which interengage to constrain said one element from turning movement with said other element.

32. The structure defined in claim 30 wherein said head has a circumferential groove which carries on O-ring seal engaged against portions of said body portion which define said opening.

* * * * *